INVENTORS.
JOHN IRVING NASMITH.
WILFRED KIRBY
ATTORNEYS.

May 1, 1945.   J. I. NASMITH ET AL   2,374,770
WIRE STITCHING MACHINE
Filed June 2, 1944      5 Sheets-Sheet 2
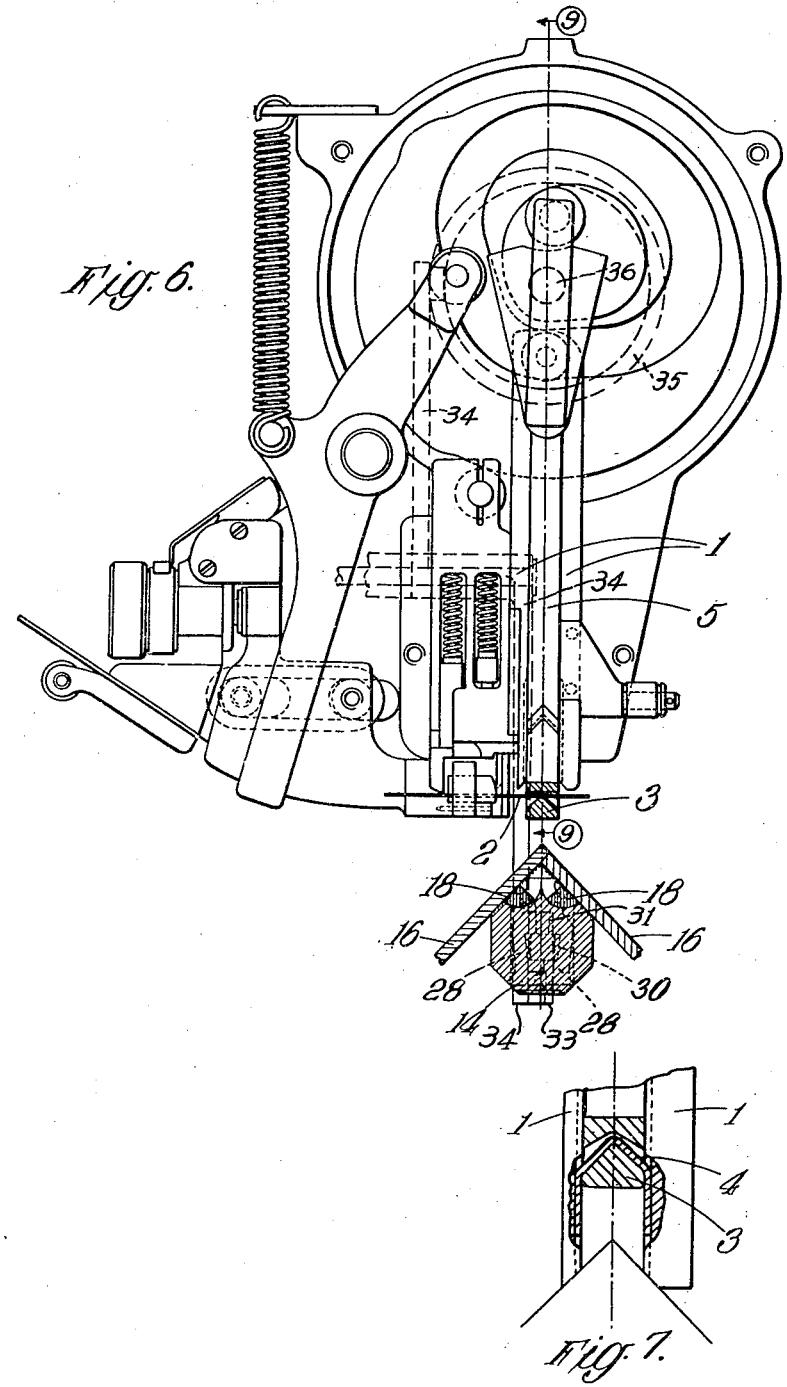
INVENTORS.
JOHN IRVING NASMITH.
WILFRED KIRBY.
by Haseltine, Lake & Co.
ATTORNEYS.

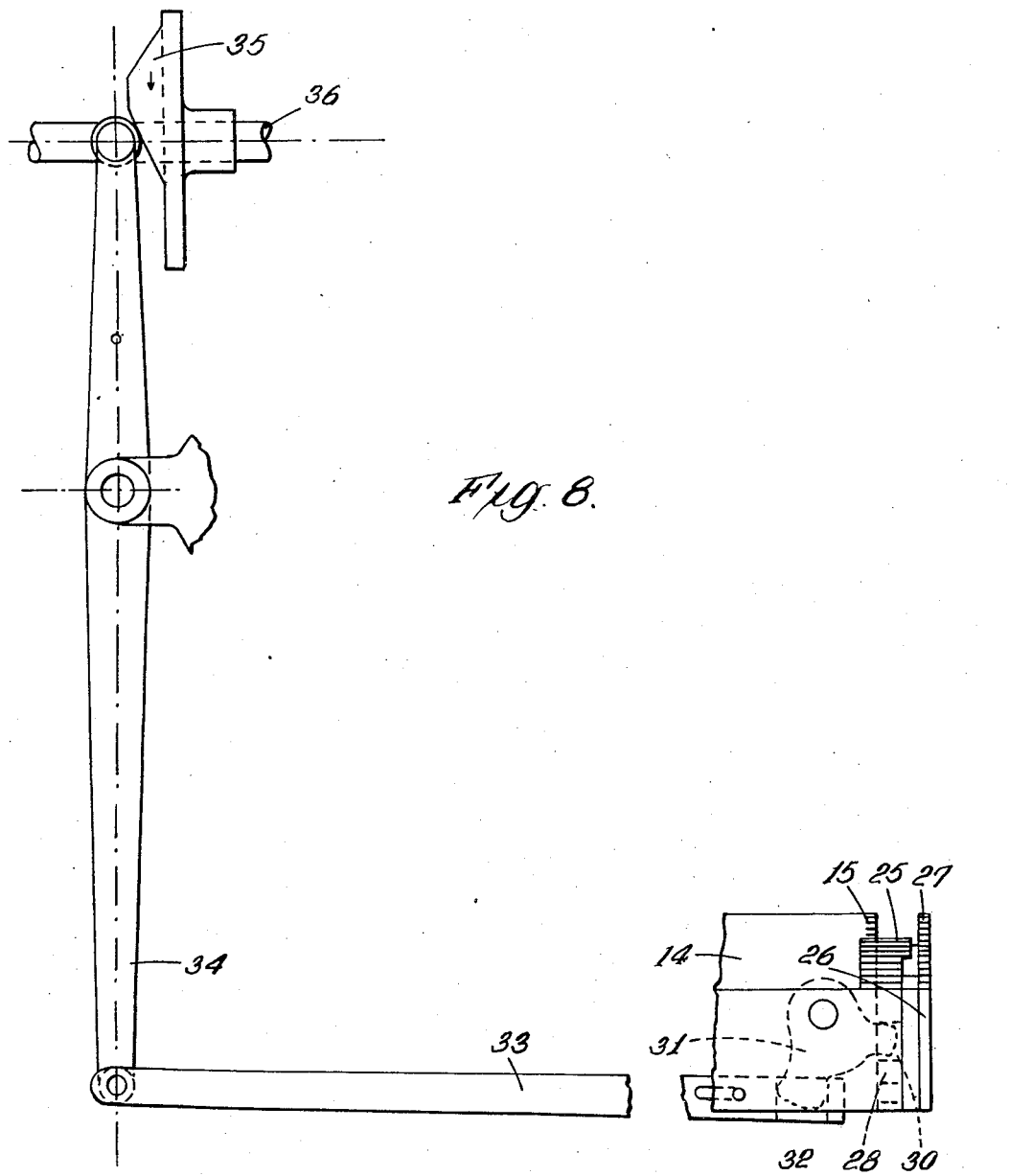

May 1, 1945.　　J. I. NASMITH ET AL　　2,374,770
WIRE STITCHING MACHINE
Filed June 2, 1944　　5 Sheets-Sheet 4

INVENTORS.
JOHN IRVING NASMITH.
WILFRED KIRBY.
by Haseltine, Lake & Co.
ATTORNEYS.

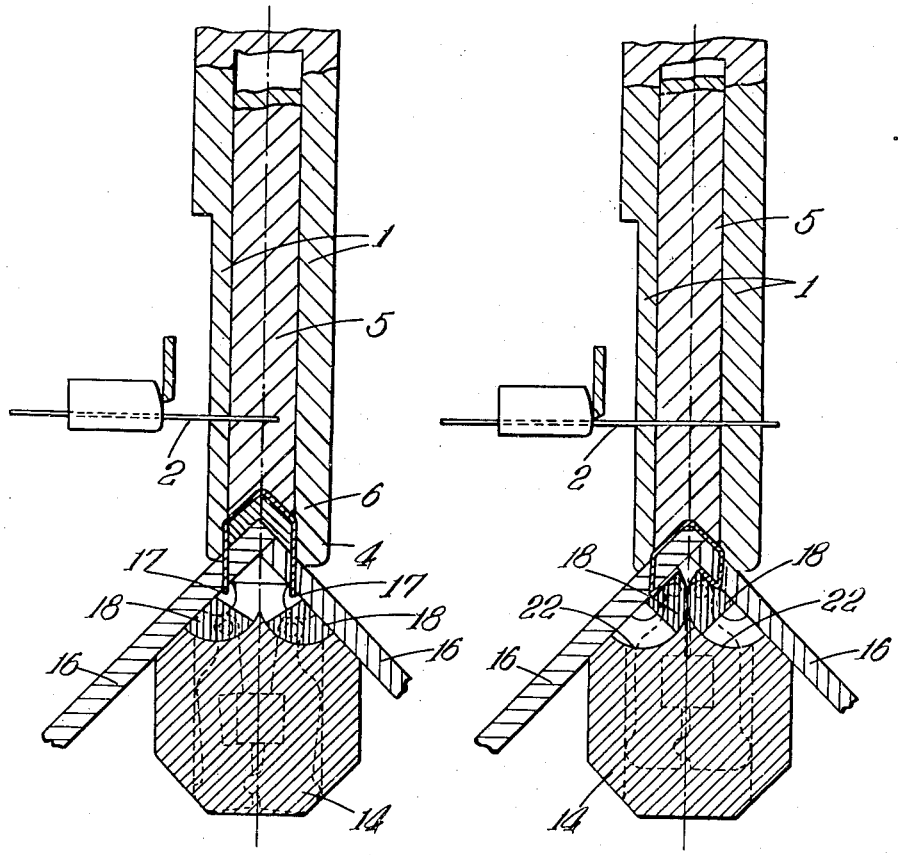

Patented May 1, 1945

2,374,770

UNITED STATES PATENT OFFICE 2,374,770

WIRE-STITCHING MACHINE

John Irving Nasmith, Chislehurst, and Wilfred Kirby, London, England, assignors to Vickers-Armstrongs Limited, London, England, a company of Great Britain Application June 2, 1944, Serial No. 538,410
In Great Britain May 25, 1940

4 Claims. (Cl. 1—11)

This invention relates to wire stitching machines and more particularly to corner wire stitching machines adapted for fastening or stapling together work pieces or parts of work pieces at right angles to each other, said pieces or parts being supported during the fastening or stapling operation on a work support or anvil, the supporting surfaces of which latter are also at right angles to each other. This application forms a continuation-in-part of application Ser. No. 402,862 filed July 17, 1941.

In machines at present in use, a piece of wire to be used for making a stitch or staple is cut from a reel and is first bent to form three sides of a rectangle or in other words an element of substantially inverted U-shape. For the sake of clarity, the two portions bent at right angles to the remainder of the wire will be hereinafter referred to as the legs of the staple, while the portion serving to connect such legs will be referred to as the crown. In all such known machines the legs of the staple so formed are folded inwardly towards each other so that on application of the staple to the surfaces of the work pieces to be fastened, said legs will be directed approximately normal to such surfaces and during penetration of the latter the crown is subsequently bent over the corner of the work to the required rectangular form. This method of corner stitching suffers from certain disadvantages since when staples of a given crown dimension are applied to work of different thicknesses the ends of the staples which project through the work and are subsequently bent over or clinched to secure the stitches, must necessarily become shorter and shorter as the thickness of the work increases, even although the necessary wire is provided in the staple for the increased thickness. The only means of avoiding this decrease in the length of the clinched ends is to increase the crowns of staples required for thicker work and that would involve changing of all parts concerned in forming the staples. Alternatively, all staples could be constructed for the greatest thickness likely to be handled, in which case clumsy and wasteful stitches would occur in all works of lesser thicknesses. Another disadvantage with the known method is that as the crown of the staple has continually to change its shape whilst the staple is being driven through the work, it is difficult and mechanically complicated satisfactorily to support said staple against collapse when penetration is resisted. Further disadvantages reside in the fact that the mechanisms required to carry out this method of stitching are more complex, less robust and efficient and considerably less reliable in operation than those of other types of wire stitching machines.

It has already been proposed directly to form, drive and clinch staples, hereinafter referred to as "angle type staples," wherein the crown is bent initially to the right angle form and each leg extends at an angle of 135° to the adjacent portion of said crown. It will be appreciated that with this type of staple the legs have to penetrate the surface of the work pieces to be stitched at an angle of 45° and that in order to clinch the stitch beneath the work the projecting ends of the staple legs have to be turned through an angle of at least 135°. In such cases, however, the crown of the staple does not change its form as the stitch is driven and also as the theoretical point of egress of the legs of the staple from the work pieces is in an invariable relation to the inside corner of the work, the size of the crown can remain invariable up to the limit of thickness, represented by the joint of the two pieces to be joined, falling safely within the crown of the stitch. No machines for satisfactorily forming, driving and clinching such angle type staples have, however, yet been produced and it is the chief object of the invention to provide a clinching mechanism including means which causes clinching members to be moved within the profile of the anvil of the machine in such manner as to complete in the most effective manner the bending of the legs for terminating the clinching operation, resulting in the legs of the staple which were parallel during their passage through the work being bent back through approximately 135° to the fully clinched position, as distinct from a known method in which the legs of the staples penetrate the work perpendicularly to the walls of the work and as a consequence of which although the legs only have to be folded through approximately 90° to the fully clinched position certain disadvantages arise as hereinafter explained. This parallel vertical entry of the staples into the work as proposed by the present invention involves a particular manner of disposing, shaping and operating the clinching members, and accordingly another object of this invention is to provide sector shaped symmetrical clinching members rotatable about their virtual axes in an anvil and so arranged that prior to the clinching operation they present their apices symmetrically towards the staple but spaced apart a distance slightly greater than the dimension across the parallel legs, whereby they force the descending legs to bend towards each other by reason of their engagement with the inner sloping sides of the sectors, and whereupon during subsequent continued operation of the means driving the staple through the work the sectors are moved about their said virtual axes to press the protruding parts of the staple legs flush between the lower faces of the work and the aforesaid inner sloping sides of the sectors. By this means the movement and action of the sectors is complementary to the most effective manner of bending the said legs through 135°.

It will be clear that in order to drive and clinch angle type staples, wherein each leg is driven into the work at an angle of 45° to the appropriate surface of the latter, certain conditions must be satisfied, which may be set out as follows:

(a) The staple must necessarily be rigidly and securely mechanically supported at all stages of penetration and in all directions.

(b) The forces set up on penetration of the material by the staple and strongly tending to push the joint open during penetration must be counteracted, and (c) Means must be provided to turn with certainty the protruding ends of the staple legs on the inside of the work through an angle of at least 135° and to press the same home without distortion in or damage to the material being stitched. The present invention is concerned with satisfying the last mentioned condition, the means for satisfying the first mentioned condition forming the subject of application Serial No. 402,862, the means for satisfying all three of the aforesaid conditions being included herein to ensure a clear understanding of the invention.

In order that the said invention may be clearly understood and readily carried into effect, the same will now be described more fully with reference to the accompanying drawings, in which:

Figure 6 illustrates the machine in the process of cutting off the required length of wire to form the staple;

Figure 7 is a sectional view drawn to an enlarged scale of the loop bar and illustrating the manner in which the staple is formed;

Figure 8 illustrates in side elevation to an enlarged scale the upper and lower clincher guide plates;

Figures 12, 13, 14 and 15 illustrate the staple in the process of being driven and clinched;

Figure 1:
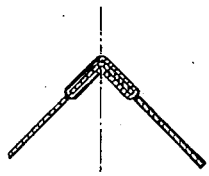
Figures 1 and 2 illustrate the application of an inverted U-shaped staple of well known form to thin and thick material respectively, the figures showing the disadvantages of the particular type.
Figure 2:
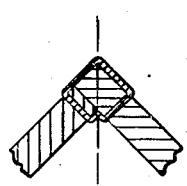
Figure 3:
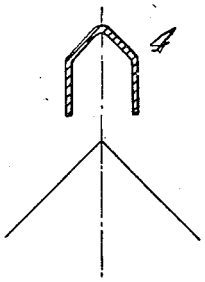
Figures 3, 4 and 5 illustrate the type of staple employed with the machine constructed in accordance with the present invention and showing the advantages of the use thereof.
Figure 4:
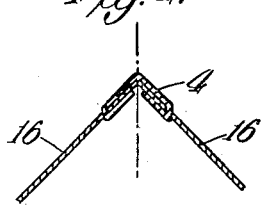
Figure 5:
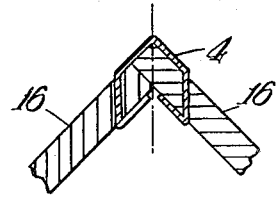

The disadvantages associated with the use of the usual type of staple will be apparent from a consideration of Figures 1 and 2 which show its application respectively to thin and thick material. It will be apparent from Figure 2 that even if the necessary wire is provided in the stitch to allow for the increased thickness, the clinched ends must necessarily become shorter and shorter as the thickness increases due to the fact that the legs of the staple are driven into the material at right angles to its surface. This is not so with the type of staple shown in Figures 3–5 used in carrying the present invention into effect, wherein the legs of the staple are driven into the material at an angle of 45° to its surface, as by increasing the length of wire used in the construction of the staple, when dealing with material of increased thickness, the length of the clinched ends can be maintained constant for thin and thick material.

Figure 9:
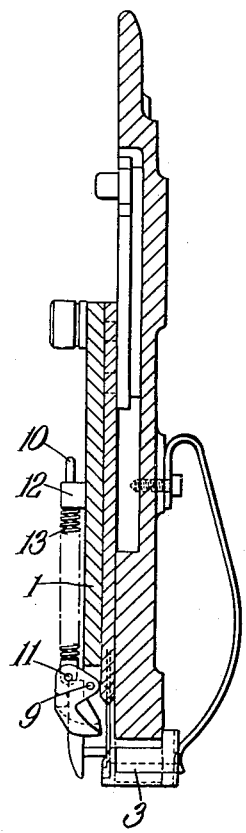
Figure 9 is a vertical section on the line 9—9 in Figure 6.
Figure 12:
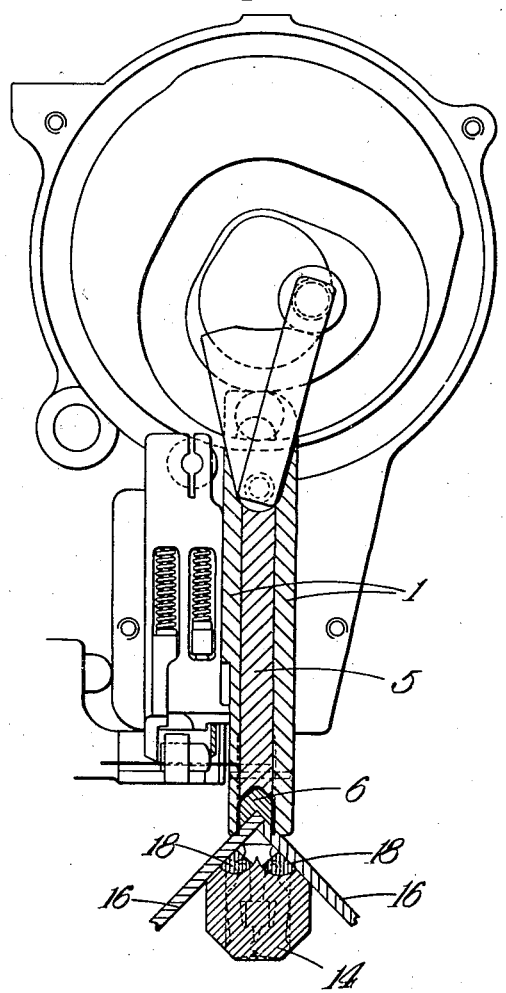
Figure 10:
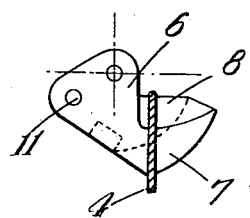
Figures 10 and 11 illustrate in side elevation and front elevation respectievly the staple support in operation.
Figure 11:
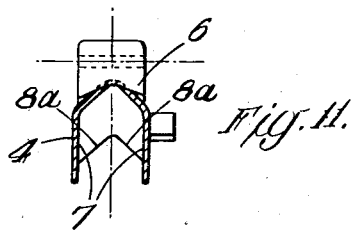

In the embodiment hereinafter described, the mechanism of the stitching machine is generally of known type and includes a reciprocatable former 1 which is adapted on each operation to bend a length of wire 2, cut from a reel, over a loop bar 3 (see Figures 6 and 7) in order to form an angle type staple 4, which latter is adapted subsequently to be driven into the work by a longitudinally reciprocatable member 5 hereinafter termed a "driver." The arrangement is such that the loop bar 3 will be withdrawn from each staple prior to the driving operation, the loop bar 3, the driver 5, the former 1 being operated in timed relation all in well known manner. The driver, the lower end of which is formed to conform to the angled crown of the staple, may for example comprise a single piece rod like member which is slidable longitudinally in a groove or recess in the former, said driver and former being reciprocated through the medium of suitably profiled cams or the like, which latter are driven in any suitable manner. In order to attain the first requirement, designated (a) above, a member is provided which is hereinafter referred to as a "staple support" and which is shown in Figures 9, 10 and 11, said support 6 being adapted, after the staple has been formed and the loop bar 3 has been withdrawn prior to driving, to support the staple internally at all stages of penetration of the work by said staple. The staple support 6 combines three features, namely, it is associated with and shares in the translational movement of the former; it is provided with two flat sides 7 which support the legs of the angle staple, and finally has an upper profile such that, at any stage of the process of driving the angle staple through the work, the section of the upper profile in the plane containing the centre line of the crown and legs of the staple will include two surfaces 8, inclined at 90° to each other and corresponding to the invariable inner profile of the crown of the angle staple. The staple support may be slidably mounted in the former or in an element associated therewith or again in a preferred construction it may be mounted for pivotal movement about a pin or the like 9 (see Figure 9) mounted on or carried by the former 1. As will be seen by Fig. 11 the part of the support 6 which enters the staple has an inverted V shaped ridge constituted by the converging surfaces 8 and an inverted V shaped channel along its lower edge constituted by the upwardly converging surfaces 8a which as shown in Fig. 13 engage flush against the rectangular corner of the work 16 to cooperate with clinching means as hereinafter described, such clinching means forming the subject of an invention described in application Serial No. 402,682.

The arrangement is such that the staple support 6 will be progressively retracted from the staple as the latter is driven into the work but preferably resilient means are associated with said support adapted normally to urge the same into its operative position wherein the staple will be supported. In those cases where the saple support is mounted for pivotal movement with respect to the former, a guide rod 10 or the like may be pivotally connected to the support at a point 11 displaced with respect to the pivotal axis of the latter, said rod being freely supported for sliding movement at a point 12 adjacent its opposite end in a bracket or the like mounted on or carried by the former while a compression spring 13 is disposed around said rod being adapted to bear at one end against the staple support and at the other against the bracket or the like and serving to urge said support into its operative position. The outer surfaces of the legs of each angle staple are supported during penetration by virtue of the fact that they are maintained, due to the presence and action of the staple support, in grooves provided in the former in the usual well known manner. The outer surface of the crown of each staple is supported directly by the base of the driver, as the angle of the angle staple remains invariable during the driving of the staple into the work may, as above indicated, be formed in a single piece, the working end being formed with a 90° profile corresponding with the crown of the staple. It will be appreciated from the foregoing that the angle staples are mechanically rigidly supported in all directions and at all stages of insertion into the work being supported internally by the staple support and externally by the grooves in the former and by the lower end of the driver. The staple forming and driving mechanism can operate substantially in the same way as for forming, driving, and supporting staples of the usual rectangular inverted U-shape as used for stitching flat as distinguished from angular work and consequently this mechanism can be made as robust, efficient and reliable as in those forms of wire stitching machines. Such mechanism, however, is well known and further reference is not necessary herein.

In order to satisfy the second requirement, designated (b) above, namely to prevent the forces, set up by resistance of the material to penetration, from displacing the work on the work support or anvil 14 (see Figures 6, 8, 12, 13 and 15) which, in the case of driving angle staples, become very strong forces, said work support or anvil 14 is formed with serrations or the like 15 (see Figure 8) in that portion thereof which is immediately opposite to the former. The high points of the serrated portion or portions are slightly elevated above the general surface of the support or anvil and are so profiled that as soon as the work 16 is clamped to the anvil by the base of the former, the serrations or the like will prevent sliding movement of the work down the sloping faces of the anvil or work support.

To achieve the third requirement, designated (c) above, it is necessary to provide special means in that part of the stitching mechanism which is adapted to turn down the protruding ends of each driven staple onto the inside of the work. This special means is the matter characterising the present invention as distinct from the foregoing matter most of which as aforesaid forms the subject of the application Serial No. 402,862. As above indicated, such projecting ends have to be turned through an angle of at least 135° and in order to avoid any distortion of the stitch and damage to the material it is essential to ensure, more especially at the earlier stages of the clinching operation (see Figures 13 and 14), that the turning over of the projecting ends 17 does not set up tearing forces in the material or in other words to ensure that a stitch can be substantially satisfactorily formed and clinched whether or not the material is present on the work support or anvil.

Figure 16:
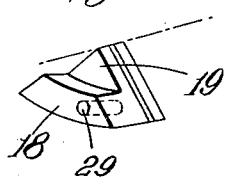
Figure 16 is a perspective view of one of the clinchers.

In accordance with the invention, a pair of clincher members 18 (shown in detail in Figure 16) are provided which are so mounted as to turn about virtual axes at each side of the stitch, said axes being so chosen as to be just outside the theoretical points of egress of the staple legs 17 and axially co-planar with the top faces of the anvil or work support 14. These axes can be at the apices of the members 18 which are of sector shape. The clinching surfaces of the clinching members 18 which actually operate on the projecting ends of the wire are so formed that they appear in front elevation as radii from the virtual axial centres and they are of such length as effectually to cover the clinched ends of the stitch at the completion of the clinching operation. If these radial operating surfaces are initially disposed at an angle of about 45° to the centre line bisecting the angle formed by the work supporting faces of the work support or anvil and supported in this position whilst the staple is being driven, the ends of the staple to be subsequently clinched will be positively curved inwardly as they protrude from the inner surface of the work without setting up any undesirable forces on said work (see Figure 14). An initial turning of the wire ends through approximately 45° thus takes place before any actual movement of the clinchers occurs. When the stitch is completely driven, the arrangement is such that the driver will remain stationary and will hold the crown of the stitch while the clinchers are operated and revolved about their virtual axes until contact is made with the internal surface of the work. During the clinching operation, it will be appreciated that until the clinchers reach the position wherein they contact with the inside surfaces of the work contact between said clinchers and the protruding staple legs only takes place at the extremity of the latter so that the maximum leverage is used to turn over the legs throughout the whole process, and the direction in which the turning force is applied throughout is such that it diminishes as much as possible the force at the points of the material about which the legs of the staple are being turned.

Figure 17:
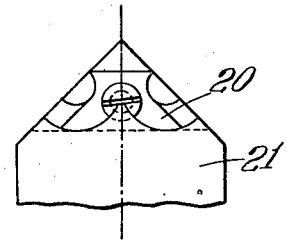
Figure 17 illustrates in side elevation the clincher guides.
Figure 18:
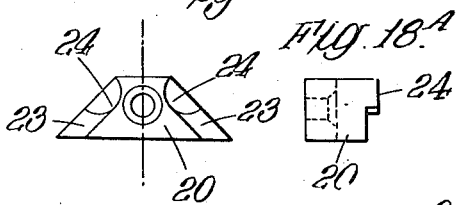
Figures 18 and 18a illustrate in side elevation and end elevation respectively the upper clincher guide plate.
Figure 18A:
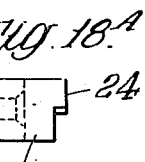
Figure 19:
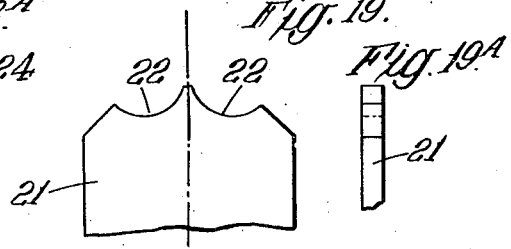
Figures 19 and 19a illustrate in side and end elevation respectively the lower clincher guide plate.
Figure 19A:
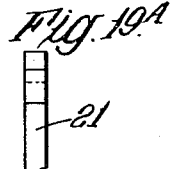

Each sector shaped clincher member may comprise a sector shaped element one face of which is formed with a sector shaped recess or portion 19 cut away (see Figure 16), said members being rotatably supported within the work support or anvil by means of upper and lower guide plates or the like, indicated respectively in Figures 17-19 by reference numerals 20 and 21. The lower guide plate 21 which is disposed within the work support or anvil in a plane coincident, or substantially coincident, with the centre line of the driver is formed at its upper edge with a pair of part circular recesses 22, each of which is adapted to conform to the curvature of the periphery of a clincher member 18 and to support said member while allowing turning movement thereof about its virtual axis. The upper guide plate 20, which is disposed adjacent the lower is shaped to conform to the outline of the work support or anvil being of truncated triangular form and provided with a pair of projections 23 each of which is formed with a part circular surface 24 adapted to cooperate with the recesses or cut away portion of a clincher member in such a manner that the latter may turn therearound while being supported in the appropriate recess 22 in the lower guide plate 21. The projections on the upper guide plate contain the virtual axes referred to above about which the clincher members are adapted to turn. The upper and lower guide plates, which latter is also so constructed as to conform to the outline of the work support or anvil, are maintained in position on application of a cover plate which is applied to the end of said anvil or work support and conforms to the outline thereof. Those portions of the edges of the guide plates which are exposed when in position are preferably provided with serrations 25 (see Figure 8) or the like whilst the edges of the cover plate 26 are also formed with serrations 27 in order to assist it holding the work securely in position during the stitching operation as above described. Suitable mechanism to revolve the clincher members between their two extreme positions, comprises a pair of links 28 pivoted to pins received in holes 29 in the segments and both recessed as at 30 to receive a common operating lever 31 engaged in a slot 32 in one end of a push-pull rod 33 connected to a spring loaded lever 34 driven off a cam faced disc 35 on a driving shaft 36.

The operation of the machine is shown in Figures 6, 7, 9, 12, 13, 14 and 15. In Figure 6 the wire is in process of being cut to the required length to form the staple, and in Figure 7 the staple is shown after being formed on the loop bar. Figure 9 shows the staple support in its inoperative position, the staple support being then moved into the position shown in Figure 12 to support the staple during the driving process. Figure 13 shows the legs of the staple protruding slightly below the under surface of the work, the staple support being partially withdrawn though still supporting the staple. In Figure 14 the legs are in process of being bent inwardly by means of the inclined faces of the clinchers and in Figure 15 the legs have been fully clinched under the action of the clinchers turning about their virtual axes.

What we claim and desire to secure by Letters Patent of the United States is:

1. In a corner wire stitching machine an anvil on which the work is supported during the driving and clinching operations, a pair of clinching members oscillatible in said anvil and formed with staple leg engaging faces in a plane substantially extending from their axes of oscillation, means to oscillate said members, said staple leg engaging faces converging towards each other substantially perpendicularly relatively to the two sides of the work to be stapled before clinching is effected and which faces are moved into substantially flush contact with said work to bend the leg ends projecting through the work flush against such work sides.

2. In a corner wire stitching machine an anvil on which the work is supported during driving and clinching operations, a pair of clinching members oscillatible about virtual parallel axes within the anvil, said axes lying actually in the work supporting faces of the anvil and being outside but close to the points of penetration of the staples through the work, said clinching members having staple leg engaging faces which are substantially perpendicular to the sides of the work being stitched in advance and immediately following penetration of the work by the staple legs so as to deflect the free ends of the legs towards each other, and means to oscillate such clinching members to urge said faces close against and parallel with the work sides to finally bend the legs against the work sides.

3. In a corner wire stitching machine an anvil on which the work is supported during driving and clinching operations, a pair of sector shaped clinching members oscillatible about virtual parallel axes within the anvil, said axes lying actually in the work supporting faces of the anvil and being in close proximity to the apices of said sector shaped members and outside but close to the points of penetration of the staples through the work, said sector shaped clinching members having staple leg engaging faces which are substantially perpendicular to the sides of the work being stitched in advance of and immediately following penetration of the work by the staple legs so as to deflect the free ends of the legs towards each other, and means to oscillate such clinching members to urge said faces close against and parallel with the work sides to finally bend the legs against the work sides.

4. A corner wire stitching machine as claimed in claim 3 including a pair of recesses in the anvil having a pair of symmetrical arcuate bases upon which rest concentrically the arcuate perimetrical points of the sector shaped clinching members and means to oscillate the clinching members upon said bases of the recesses in such manner as to move the clinching members to and from clinching position within the profile outline of the anvil.

JOHN IRVING NASMITH.
WILFRED KIRBY.